March 23, 1943.         F. A. JOHNSON         2,314,401
BISCUIT AND COOKY CUTTER AND EJECTOR
Filed Jan. 16, 1941

INVENTOR.
FRANK A JOHNSON
BY Edward C Healy
ATTORNEY.

Patented Mar. 23, 1943

2,314,401

UNITED STATES PATENT OFFICE 2,314,401

BISCUIT AND COOKY CUTTER AND EJECTOR

Frank A. Johnson, San Francisco, Calif.

Application January 16, 1941, Serial No. 374,619

1 Claim. (Cl. 30—130)

This invention relates to improvements in cutters and has particular reference to a biscuit and cooky cutter and ejector.

The principal object of the invention is the provision of a receptacle for rapidly, uniformly, and sanitarily forming loose dough material into cookies, biscuits and the like in uniform shape and size and, also, to provide an efficient and simply constructed ejector mechanism, whereby the formed dough may be easily and quickly ejected.

An additional object of the invention is the provision of a unitary receptacle and finger holding medium, whereby the manufacturing cost of the device is reduced to a minimum, and a most durable and serviceable article is realized.

Other objects and advantages will be apparent during the course of the following description.

In the accompanying drawing forming a part of this specification and in which like numerals are employed to designate like parts throughout the same, Fig. 1 is a top plan view of the device constructed in accordance with my invention;

Figure 1:
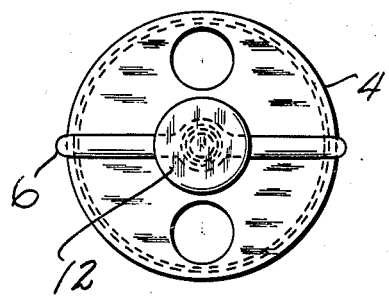

In the accompanying drawing wherein for the purpose of illustration is shown a preferred embodiment of my invention, the numeral 4 designates an inverted cup-shaped member having a tapered lower end 5, which member has integrally formed therewith a finger retaining medium 6 in the form of a plate positioned substantially at right angles to the top of the member 4 and equipped with spaced openings 7 and 8 in which two of the fingers of the operator are received.

Figure 2:
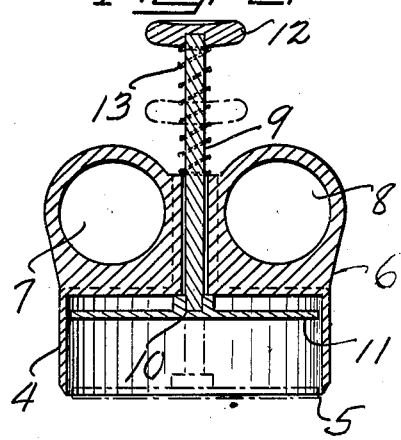
Fig. 2 is a vertical section through the device.
Figure 3:
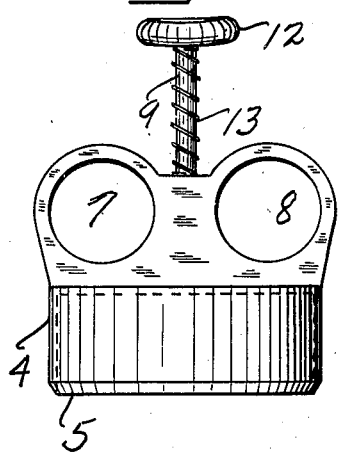
Fig. 3 is a side elevational view of the same.

It will be noted, as disclosed to advantage in Fig. 2, that the medial portion of the plate is centrally bored for receiving therein a shaft 9 that has secured to its lower end, as at 10, a disc 11 of smaller diameter than the diameter of the cup-shaped member 4. On the opposite end of the shaft there is secured a knob 12 that has a concave upper surface to accommodate the thumb of the operator. A coil spring 13 surrounds the upper portion of the shaft 9 and has its upper extremity contacting the lower surface of the knob 12 and its lower extremity contacting the top of the medial portion of the plate 6.

By virtue of this construction when pressure is applied by the thumb to the knob 12, the spring 13 will contract, and the shaft 9, travelling through the bore of the plate 6, will impart a vertical downward movement to the disc 11. The normal expansion of the spring will return the shaft, knob and plate to their normal positions, as disclosed to advantage in Fig. 2.

In the operation of the device it is only necessary to place the inverted cup-shaped member over the batch of dough, and the desired cooky or biscuit will be formed in the receptacle. When it is desired to eject the cooky, pressure, as before stated, applied to the knob will result in a quick and positive ejection of the formed dough to a cooking vessel or the like.

It will be obvious that by virtue of the construction employed, a comfortable support is provided for the fingers and the thumb during the forming of the dough and the ejection of the same.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A cooky cutter and ejector including in combination a hollow body open at one end and capable of receiving dough therein for forming a cooky, a reinforcing rib longitudinally extending onto and across the top face of said body, an ejector slidably mounted in the hollow body, said ejector including a shaft that extends through the top surface of the body and through the rib thereon, a knob fixed on the outer end of said shaft, a coil spring mounted on the shaft and interposed between the knob and the top central portion of the rib, and a pair of round openings formed through said rib for receiving the operator's fingers to facilitate the movement manually imparted to the ejector for ejecting the cooky, said reinforcing rib and hollow body being integrally formed of a single piece of material.

FRANK A. JOHNSON.